(12) United States Patent
Lundh et al.

(10) Patent No.: US 9,599,401 B2
(45) Date of Patent: Mar. 21, 2017

(54) METHOD AND A CONTROL SYSTEM FOR CONTROLLING A MELTING AND REFINING PROCESS

(71) Applicant: ABB Schweiz AG, Baden (CH)

(72) Inventors: Michael Lundh, Vasteras (SE);
Xiaojing Zhang, Vasteras (SE);
Jan-Erik Eriksson, Vasteras (SE);
Lidong Teng, Vasteras (SE);
Carl-Fredrik Lindberg, Vasteras (SE)

(73) Assignee: ABB Schweiz AG, Baden (CH)

( * ) Notice: Subject to any disclaimer, the term of this patent is extended or adjusted under 35 U.S.C. 154(b) by 230 days.

(21) Appl. No.: 14/249,028

(22) Filed: Apr. 9, 2014

(65) Prior Publication Data
US 2014/0305261 A1    Oct. 16, 2014

(30) Foreign Application Priority Data

Apr. 16, 2013  (EP) .................................. 13163894.2

(51) Int. Cl.
*F27B 3/28*    (2006.01)
*F27D 19/00*    (2006.01)
(Continued)

(52) U.S. Cl.
CPC .............. *F27D 19/00* (2013.01); *C21C 5/5211* (2013.01); *C22B 4/08* (2013.01); *F27B 3/28* (2013.01);
(Continued)

(58) Field of Classification Search
CPC .. F27D 19/00; F27D 27/00; F27D 2019/0003; F27B 3/085; F27B 3/28
See application file for complete search history.

(56) References Cited

U.S. PATENT DOCUMENTS 5,785,426 A *   7/1998   Woskov ................. G01J 5/522
                                                         374/122
6,026,113 A    2/2000   Pavlicevic et al.
(Continued)

FOREIGN PATENT DOCUMENTS

CN    102554172 A    7/2012
EP       0835942 A1    4/1998
(Continued)

OTHER PUBLICATIONS

European Search Report Application No. EP 13 16 3894 Completed: Sep. 26, 2013 3 pages.

*Primary Examiner* — Roy King
*Assistant Examiner* — Tima M McGuthry Banks
(74) *Attorney, Agent, or Firm* — Whitmyer IP Group LLC

(57) ABSTRACT

A method and device for controlling a melting and refining process in an electric arc furnace for melting a metal, wherein the electric arc furnace includes molten and solid metal and a slag layer on the surface of the molten metal, wherein an electromagnetic stirrer is arranged for stirring the molten metal. The method includes calculating/determining masses of the molten and solid metal at a point of time, wherein the calculation is based on initial values of the molten and solid metal, an arc power supplied to the electric arc furnace, and temperatures of the molten and solid metal, determining a stirring power based on the calculated/determined masses, and supplying the determined stirring power to the electromagnetic stirrer.

12 Claims, 3 Drawing Sheets

(51) Int. Cl.
*F27D 27/00* (2010.01)
*C22B 4/08* (2006.01)
*C21C 5/52* (2006.01)
*F27B 3/08* (2006.01)

(52) U.S. Cl.
CPC ...... *F27D 27/00* (2013.01); *C21C 2005/5276* (2013.01); *C21C 2005/5288* (2013.01); *F27B 3/085* (2013.01); *F27D 2019/0003* (2013.01); *F27D 2019/0006* (2013.01); *Y02P 10/216* (2015.11)

(56) References Cited

U.S. PATENT DOCUMENTS 7,255,828 B2 8/2007 Kasprzak et al.
8,888,888 B2 * 11/2014 Lundh ................... C21C 5/5211
75/10.12

FOREIGN PATENT DOCUMENTS

| | | |
|---|---|---|
| GB | 1570636 A | 7/1980 |
| JP | H10330824 A | 12/1998 |
| WO | 2012034586 A1 | 3/2012 |
| WO | 2013010575 A1 | 1/2013 |

* cited by examiner

METHOD AND A CONTROL SYSTEM FOR CONTROLLING A MELTING AND REFINING PROCESS

FIELD OF THE INVENTION

The present invention relates to a method and a control system for controlling a melting and refining process in an electric arc furnace comprising one or more electrodes for melting metal or metal alloys and an electromagnetic stirrer is arranged for stirring the molten metal or metal alloys. In particular, the present invention relates to controlling of the power of the electromagnetic stirrer.

BACKGROUND OF THE INVENTION

An electric arc furnace (EAF) is a furnace utilizing electric arc to melt metal or metal alloys. A typical EAF comprises three electrodes, a power supply system operatively connected to the electrodes and a vessel. The vessel is provided with a refractory lining for withstanding high temperature. The EAF is further equipped with gas burners mounted on the sidewalls and arranged to provide chemical energy to a melt. Additional chemical energy is provided by means, e.g. lances, for injecting oxygen and carbon into the furnace. The operation of the electrodes is controlled by a control unit operatively connected to the power supply system. The power supplied to the electrodes thereby creating an arc is called arc power. The electrodes form an arc between the electrodes and the metallic material, i.e., solid metal (e.g. scrap) that has been loaded into the EAF. Thereby, a metallic melt is created and heated by the arc power and chemical energy from the oxygen injection. An electrode controlling system maintains approximately constant current and power input during the melting of the metallic material.

Both molten metal and melt mean metal in a liquid form.

An electromagnetic stirring (EMS) system may be arranged to stir the melt in the furnace. A typical EMS-system comprises at least one electromagnetic stirrer comprising a stirring coil, a power supply system is operatively connected to the stirrer and including a frequency converter and a transformer, a cooling water station and at least one control unit operatively connected to the power supply system to control the operation of the stirrer. The stirring coil is typically mounted outside a steel shell of the furnace. This coil generates a travelling magnetic field to provide stirring forces to the melt. The stirrer operates at a low frequency travelling magnetic field, penetrating the steel shell of the furnace and moving the melt in a way similar to a linear electric motor. Thus, a linear force is created by the travelling linear magnetic field acting on the melt in the furnace. The power supplied to the electromagnetic stirrer is called stirring power.

The stirring power is often determined by an ad hoc scheme that is largely depending on experiences of an operator at a production site. This means that the operator decides the stirring operation, i.e. the intensity/strength of the stirring, by manually switching on or off the stirring power. The ad hoc scheme not only results in refractory wears of the EAF but also unnecessary electric energy consumption.

WO 2013/010575 discloses a method and a control system for controlling a melting process in an electric arc furnace for melting a metallic material. The method comprises the steps of receiving or collecting measured data of at least one process variable, determining the current state of the process, performing an optimization of the melting process, determining a process input based on the result of the optimization, and controlling the melting process by means of the process input.

SUMMARY OF THE INVENTION

It is an object of the present invention to increase productivity, and reduce refractory wears of an EAF and unnecessary electric consumptions of a stirring power and an arc power.

In the first aspect of the invention, there is a method provided for controlling a melting and refining process in an electric arc furnace for melting a metal, wherein the method comprises steps of calculating/determining masses of the molten and solid metal at a point of time, wherein the calculation is based on initial values of the molten and solid metal, an arc power supplied to the electric arc furnace, and temperatures of the molten and solid metal, determining a stirring power based on the calculated/determined masses, and supplying the determined stirring power to the electromagnetic stirrer.

Because the determination of a stirring power is dependent on the masses of the molten and solid metal, and an arc power, a maximum stirring effect is achieved, which decrease tap-to-tap time and increase productivity. At the same time, unnecessary stirring is minimized and thus refractory wears are reduced.

According to an embodiment of the invention, the method comprises calculating a function based on the calculated molten and solid metal, determining a stirring power based on the calculated function, and supplying the determined stirring power to the electromagnetic stirrer.

According to one embodiment of the invention, the method comprises determining temperatures of molten and solid metal based on an arc power and determined masses of molten and solid.

According to one embodiment of the invention, the method comprises measuring a temperature of molten metal at a sufficiently high sampling rate. Alternatively, a temperature of molten metal may be continuously measured.

In a preferred embodiment, the method comprises using microwave radiometer to measure radiation from the molten metal and converting the measured radiation to the temperature of the molten metal.

In another preferred embodiment, the method comprises using non-contact sensors to measure the temperature of the molten metal.

In a third preferred embodiment, the method comprises measuring a temperature of the slag layer and calibrating the measured temperature to the temperature of molten metal.

According to one embodiment of the invention, the method comprises determining a tapping temperature at the refining process based on the measured temperature.

It is advantageous to provide continuously on-line measures of the temperature of the molten metal in the EAF to reduce tap-to-tap time, thus to increase the productivity.

In a second aspect, there is a control system provided for controlling a melting process in an electric arc furnace for melting a metal, wherein the electric arc furnace comprises molten and solid metal, and a slag layer on the surface of the molten metal, and an electromagnetic stirrer is arranged to stir the molten metal, wherein the control system comprises a control unit configured to calculate/determine masses of the molten and solid metal at a point of time, wherein the calculation is based on initial values of the molten and solid metal respectively, a power supplied to the electric arc furnace, and temperatures of the molten and solid metal, determine a stirring power based on the calculated/determined masses, and provide the determined stirring power to the electromagnetic stirrer.

In one embodiment of the invention, the control unit is further configured to calculate a function based on the calculated molten and solid metal, determine a stirring power based on the calculated function, and provide the determined stirring power to the electromagnetic stirrer.

In another embodiment of the invention, the control system further comprises a temperature measuring device for measuring a temperature of the molten metals in the furnace.

Such device may be either a non-contact sensor unit or a microwave radiometer unit and comprises a sensing element and a processing unit. The sensing element is configured to sense/measure the temperature of the molten metal and send the measured temperature to the processing unit, and the processing unit is configured to receive the measured temperature, process the received temperature and send the processed measured temperature to the control unit.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 2:
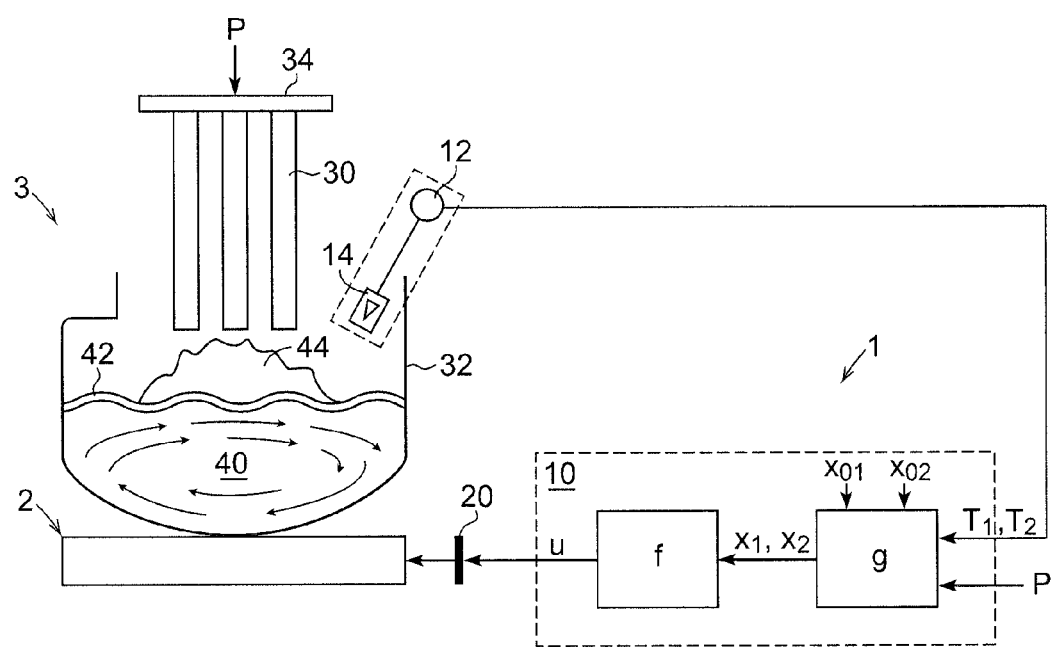
FIG. 2 illustrates a system schematic chart of a control system for controlling a stirring power to an EMS, according to a third embodiment of the invention.

FIG. 2 illustrates a control system 1 for controlling a stirring power to an electromagnetic stirring (EMS) system 2 of an electrical arc furnace (EAF) 3. The EAF is arranged for melting metallic materials, for example metals or metal alloys. A scrap 44 is loaded with a bucket into the EAF prior to the melting process. The EAF may be a DC EAF or an AC EAF.

The EAF further comprises one or more electrodes 30, a vessel 32 covered with a retractable roof through which the one or more graphite electrodes enter the furnace and a power supply system 34 operatively connected to the electrodes 30.

The EAF operation starts with the vessel 32 being charged with scrap metal 44, wherein the meltdown commences. The electrodes 30 are lowered onto the scrap 44 and an arc is struck thereby starting to melt the scrap. Lower voltages are selected for this first part of the operation to protect the roof and walls of the furnace from excessive heat and damage from the arcs. Once the electrodes have reached the heavy melt at the base of the furnace and the arcs are shielded by slag the voltage can be increased and the electrodes are raised slightly, thereby lengthening the arcs and increasing power to the melt. As the scrap 44 is melt into a molten metal 40, a slag layer 42 may be formed on the surface of the melt 40.

The EMS 2 is mounted on an outer surface, preferably the bottom of the EAF vessel 32, but it could be side mounted as well. The EMS system 2 is arranged to stir a molten metal in the EAF and thus accelerate the process for melting metal.

The EMS 2 further comprises a stirring power supply system 20 is operatively connected to the stirrer.

The control system 1 comprises a control unit 10 that is operatively connected to the stirring power supply system 20 to control the operation of the stirrer. The control unit 10 may comprise hardware, a memory unit, at least a processing unit into which software is loaded.

Figure 1A:
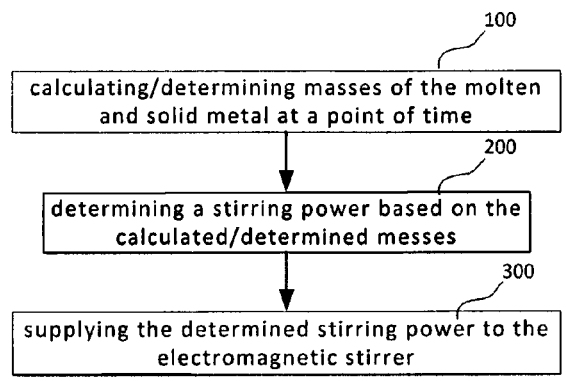
FIG. 1a shows a flowchart of controlling a stirring power, according to one embodiment of the invention.
Figure 1B:
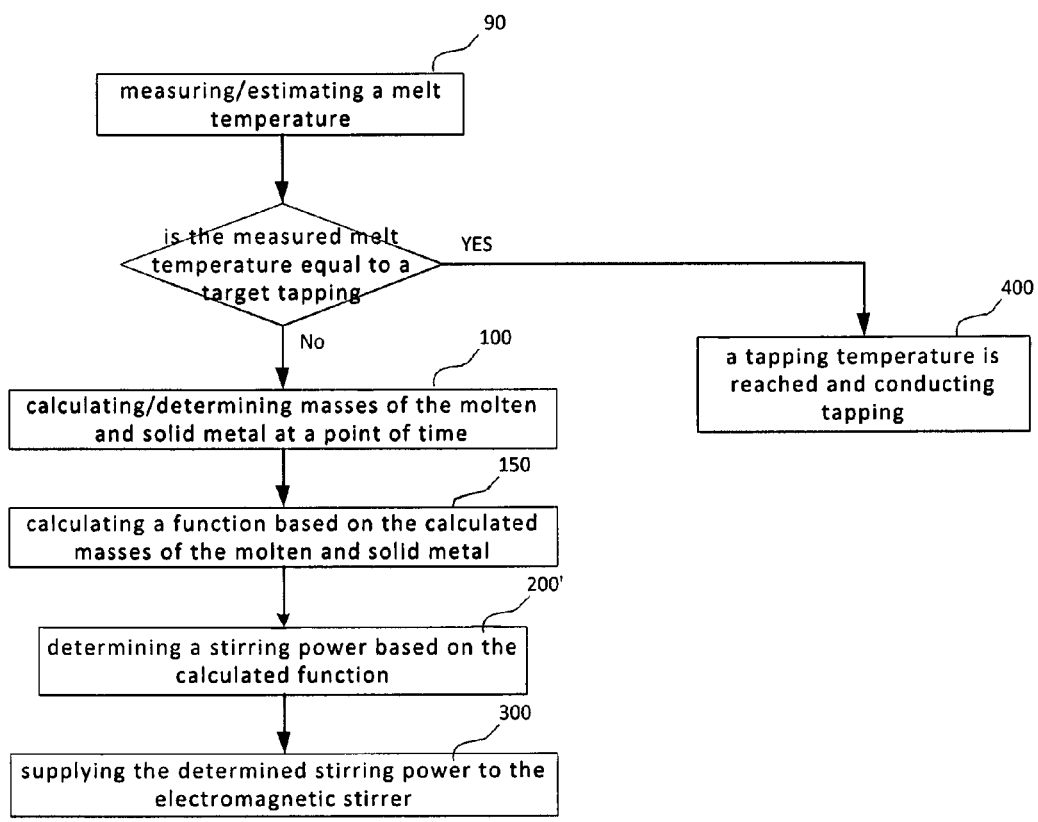
FIG. 1b shows a flowchart of controlling a stirring power, according to another embodiment of the invention.

With reference to FIGS. 1a and 1b, the control unit 10 is configured to calculate or determine masses of the molten and solid metal at a point of time, wherein the calculation is based on initial values of the molten and solid metal, an arc power supplied to the EAF, and temperatures of the molten and solid metal, step 100. The calculation may be given as an example as follows, $$x_1(t)=g_1(x_{01},x_{02},P,T_1)$$

$$x_2(t)=g_2(x_{02},P,T_2)$$

where, $x_1(t),x_2(t)$ is the mass of the molten and solid metal and may be for example calculated as integral at a time instant t during a melting process; $x_{01},x_{02}$ are the initial values of the molten and solid metal; P is an arc power supplied to the electrodes, and $T_1$, $T_2$ is the temperature of the molten and solid metal, wherein $T_1$, $T_2$ may be determined based on the arc power P and determined masses of molten and solid. Alternatively, they can be measured, step 90.

The control unit is further configured to determine a stirring power based on the calculated/determined masses of the molten and solid metal, step 200. As an example, the determination is done by a function of the calculated/determined masses of the molten and solid metal as follows, step 150.

$$u=f(x_1,x_2,\ldots)$$

Preferably, no stirring power is supplied to the EMS when the molten metal is less than a certain level of a total amount of the metal. The range of the level may be between 25-35% of the total amount of the metal. This means that the stirrer will not operate when the molten metal has not reached a pre-defined level. The stirring power may be in the form of current when the voltage of the stirring power is fixed.

The stirring power/current is then gradually increased during the melting process and reaches to a full stirring power. Since the determined stirring power is a set-point of the electromagnetic stirrer, a proper stirring intensity/strength, i.e. induced stirring and movement in the furnace, is consequently obtained. The full stirring power thus stirring strength is kept during the refining process.

As another example, the control unit may be further configured to calculate a radio between the molten metal and the total amount of the metal. A stirring power is then determined based on the calculated ratio, step 200', $$u=f(x_1,x_2,u_{max})$$

where $$u = \begin{cases} 0, & \text{if } x_1/(x_1 + x_2) < 0.3 \\ (x_1/(x_1 + x_2))u_{max}, & \text{if } x_1/(x_1 + x_2) \geq 0.3 \end{cases}$$

Thus, the stirring current to be supplied to the stirrer is increased in proportion to the ratio of the molten metal and the total amount of the metal after the molten metal exceeds 30% of the total amount of the metal. Therefore the more the masses of molten metal in the EAF, the more stirring current will be provided to the EMS.

The determined stirring current is provided to the electromagnetic stirrer, step 300 to control the intensity of the stirring. Other advantages of having a controlled stirring are enabling of stable arcs and a stable slag layer.

At some occasions, the charge of the EAF may be provided by loading a sequence of buckets with new material (scrap and slag) to the EAF. In such a case, the control unit is further configured to recalculate masses of solid metal after each of loadings, and temperature of the solid metal are adjusted to reflect the changes, and thereby to determine a stirring current accordingly.

The control unit may be further configured to calculate a current amount of carbon to be injected in the furnace and a current flow of oxygen to be injected into the furnace. Due to controlled stirring, performance from oxygen lancing is enhanced by providing fresh carbon-rich steel during the oxygen injection and the oxygen yield is improved.

The control system may further comprise a temperature measuring device 10 for measuring a temperature $T_1$ of the molten metals in the furnace, step 90. In such a case, a measured melt temperature $T_1$ is provided to the control unit. This facilitates a more accurate control of tapping time. The temperature measuring device may further comprise a sensing element 14 and a processing unit 12. The sensing element 14 is configured to sense or measure the temperature of the molten metal. The sensed temperature is further sent to the processing unit 12 that is configured to further process the measured temperature and sends the processed measured temperature to the control unit.

Due to smoke and harsh environment of production sites, it is difficult to obtain continuously on-line measurements of a melt. One way to measure a melt temperature is to use disposable temperature probes. A probe is placed into the melt at end of the refining process. If not a sufficient temperature is obtained a further probe is placed until a correct or close enough temperature is obtained. Thus, to measure the melt temperature, an operator or robot may have to place temperature probes a few times. If the obtained melt temperature is above the target tapping temperature, a large amount of arc power/energy has been already wasted. Therefore, it is advantageous that melt temperatures can be measured continuously or at a sufficiently high sampling rate to prevent the melt from a late tapping, which means that a sensing element with a high sampling rate is preferred. This enables a tapping just in time and thus increases productivity and saves large amount energy of arc power.

In the example of FIG. 2, a non-contact sensor is illustrated. However, a microwave radiometer can be used as well. When a microwave radiometer is used, radiation from the molten is measured. The radiation is less sensitive to smoke and vapour and is able to penetrate through optically thick materials like slag layer 42, therefore a temperature of the melt can be determined based on the reflection of radiation.

In a yet another embodiment, the temperature of a slag layer is measured, which is further calibrated so as to obtain a temperature of the molten metal. An electromagnetic stirring makes it possible to use a measured slag temperature. First of all, this is because an electromagnetic stirring increase melting rate, the temperature in the vessel of an EAF is quite homogenous and uniform compared to no stirring since there are large local temperature variations in a melt if no stirring. Secondly, since the stirrer generates a linear force that enables the melt move along a direction, it is thus easier to open an eye on the slag at a place where the slag is almost pushed away, which makes temperature measurement possible and meaningful.

Due to the fact that it is able to provide continuously on-line measurements of the melt, a tapping temperature is able to be determined at the refining stage and a tapping can be therefore conducted in time, step 400, which decreases tap-to-tap time and increases consequently the productivity.

Figure 3:
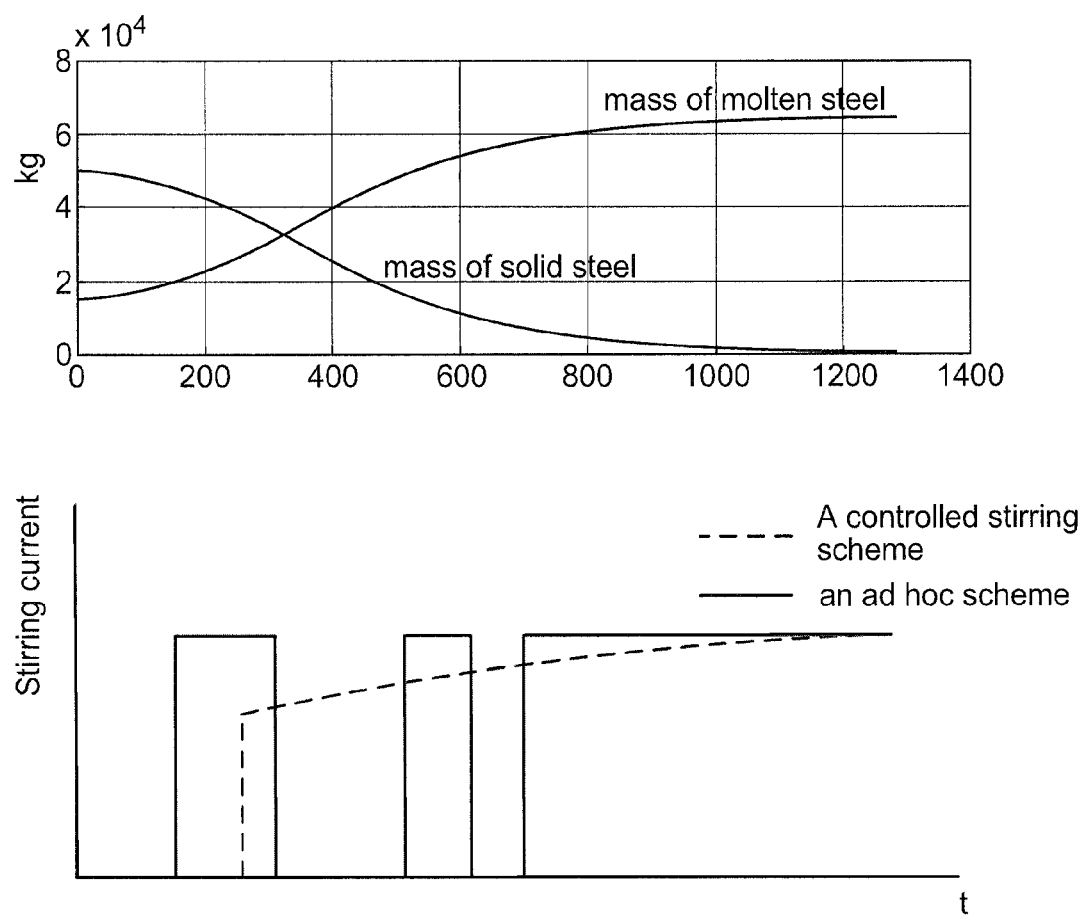
FIG. 3 illustrates a relationship between a stirring power supplied to the EMS and the masses of molten and solid steel, according to a fourth embodiment of the invention.

FIG. 3 shows trajectories of molten and solid metal in a melting process, and, in accordance with this melting process, a stirring current supplied to the stirrer in time of a melting process. The figure shows no stirring at the beginning of a melting process. As the scrap is melt so decreased while the melt is increased to a certain level, the stirring power is switched on. The stirring current is gradually increased to a full/maximum stirring current, which will be kept as full in refining stage.

In comparison, the figure also shows an ad hoc scheme of stirring current where a stirring power is switched on or off from time to time by experiences of an operator.

It should be understood that the scope of the invention must not be limited the presented embodiments, it shall cover other embodiments that are obvious to a person skilled in the art.

What is claimed is:

1. A control system for controlling a melting process in an electric arc furnace for melting a metal, wherein the electric arc furnace comprises molten and solid metal and a slag layer on the surface of the molten metal and, wherein an electromagnetic stirrer is arranged to stir the molten metal, the control system comprising a control unit configured to carry out the steps of calculating/determining masses of the molten and solid metal at a point of time, wherein the calculation is based on initial values of the molten and solid metal, an arc power supplied to the electric arc furnace, and temperatures of the molten and solid metal, wherein the control unit is further configured to carry out the steps of calculating a function based on the calculated/determined masses of the molten and solid metal at the point in time, determining a stirring power based on the calculated function, and supplying the determined stirring power to the electromagnetic stirrer.

2. The control system according to claim 1, further comprising a temperature measuring device for measuring a temperature of the molten metals in the furnace.

3. The control system according to claim 2, wherein the temperature measuring device is a non-contact sensor unit or a microwave radiometer unit.

4. The control system according to claim 2, wherein the temperature measuring device comprises a sensing element and a processing unit, wherein the sensing element is configured to sense/measure the temperature of the molten metal and send the measured temperature to the processing unit, and the processing unit is configured to receive the measured temperature, process the received temperature and send the processed measured temperature to the control unit.

5. The control system according to claim 1, wherein the control unit determines temperatures of molten and solid metal based on the arc power and determined masses of molten and solid.

6. The control system according to claim 1, wherein the control unit measures a temperature of molten metal at a sampling rate.

7. The control system according to claim 1, wherein the control unit continuously measures a temperature of molten metal.

8. The control system according to claim 6, wherein the control unit measures a temperature of the slag layer and calibrates the measured temperature to the temperature of molten metal.

9. The control system according to claim 6, wherein the control unit uses a microwave radiometer to measure radiation from the molten metal and converts the measured radiation to the temperature of the molten metal.

10. The control system according to claim 6, wherein the control unit determines a tapping temperature at the refining process based on the measured temperature.

11. The control system according to claim 6, wherein the sampling rate is high enough to prevent the melt from a late tapping.

12. The control system according to claim 1, wherein no stirring power is supplied to the electromagnetic stirrer when the mass of molten metal is less than a certain level of a total mass of the molten and solid metal.

\* \* \* \* \*